United States Patent [19]

Nishikubo et al.

[11] 3,867,318
[45] Feb. 18, 1975

[54] PHOTOSENSITIVE POLYMERIC ESTERS PRODUCED BY THE CONDENSATION OF A CHLOROMETHYL GROUPS-CONTAINING POLYMER WITH A CARBOXYL SALT

[75] Inventors: Tadatomi Nishikubo; Yoshinori Imamura; Yoshiko Tomiyama; Kiyoshi Maki, all of Fujisawa, Japan

[73] Assignee: Nippon Oil Seal Industry Co., Ltd., Fujisawa, Kanagawa, Japan

[22] Filed: Nov. 20, 1970

[21] Appl. No.: 91,525

[30] Foreign Application Priority Data
Dec. 10, 1969 Japan.............................. 44-98651
Dec. 10, 1969 Japan.............................. 44-98652
May 11, 1970 Japan.............................. 45-39978

[52] U.S. Cl................. 260/2 A, 96/88, 117/124 E, 117/132 B, 117/138.8 E, 117/138.8 F, 161/216, 204/159.11, 204/159.22, 260/2 XA, 260/85.7 R, 260/86.1 R, 260/86.3, 260/86.7, 260/89.1, 260/89.5 H, 260/89.5 S, 260/91.1 S
[51] Int. Cl............................................ C08g 23/20
[58] Field of Search ......... 260/89.5 H, 89.5 S, 89.1, 260/91.1 S, 91.1 R, 2 A, 2 BP; 96/47 UA, 47 UP, 2 XA, 35.1, 115, 85.7 R

[56] References Cited
UNITED STATES PATENTS
3,560,465 2/1971 Reynolds .......................... 260/91.3
3,645,917 2/1972 Vandenberg........................... 260/2

Primary Examiner—Melvin Goldstein
Assistant Examiner—T. Pertilla
Attorney, Agent, or Firm—Holman & Stern

[57] ABSTRACT

Production of a polymeric ester having photosensitive properties and the following group in the side chain of its repeating unit

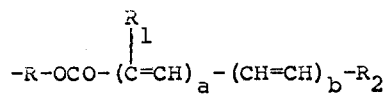

wherein R is an aliphatic chain, $R_1$ is hydrogen or a nitrile group, $R_2$ is a substituted or non-substituted aromatic group and $a$ and $b$ are 0 or 1. The ester can be prepared by reacting polyglycidol or a polyacrylate with an acid halide or by condensing a polymer with a chloromethyl group in its aliphatic side chain with a carboxyl salt.

4 Claims, No Drawings

PHOTOSENSITIVE POLYMERIC ESTERS PRODUCED BY THE CONDENSATION OF A CHLOROMETHYL GROUPS-CONTAINING POLYMER WITH A CARBOXYL SALT

This invention relates to the production of polymeric esters and relates more particularly to the production of polymeric esters which exhibit photosensitivity. Such photosensitive polymeric esters can be prepared by (1) esterifying polyglycidol with an acid halide, (2) esterifying a polyacrylate with an acid halide, and (3) condensing a polymer having a chloromethyl group in its aliphatic side chain with a carboxy salt.

Generically, the photosensitive polymeric ester of this invention is a polymeric ester having in the side chain of its repeating unit the following group:

(1) 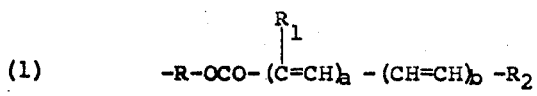

wherein R is an aliphatic chain, $R_1$ is hydrogen, or a nitrile group, $R_2$ is a substituted or a non-substituted aromatic group, and $a$ and $b$ are 0 or 1.

Glycidol (2,3-epoxypropanol) is easily polymerized by boiling in pyridine, the addition of boron trifluoride diethylether complexes, etc. to give the polyglycidol of a relatively low molecular weight polymer. When the polyglycidol is reacted with an acid halide represented by the following general formula:

(2) 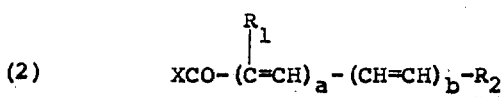

wherein $R_1$ is hydrogen or a nitrile group, $R_2$ is a substituted or non-substituted aromatic group, X is halogen, and $a$ and $b$ are 0 or 1, it had been foudn that most of the resultant novel polyglycidyl esters, except in the case of an ester of benzoic acid (a=0, b=0), etc, have photosensitivity. However, with all of the embodiments of this invention, even where $a=b=0$, photosensitivity will be found when one of the following groups are in the side chain:

(3) 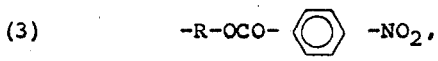

(4) 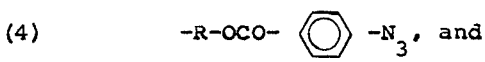

(5) 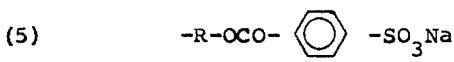

wherein R is an aliphatic chain.

Accordingly, according to one feature of this invention, a novel polyglycidyl ester can be prepared by reacting a polyglycidol with an acid halide represented by the above mentioned general formula, wherein $R_2$ is an aromatic group such as phenyl, m-nitrophenyl, p-chlorophenyl, acetoxy phenyl, styryl phenyl, p-methoxyphenyl, 1-naphthyl, 2-naphthyl, 9-anthoryl, 2-furfuryl and 2-thienyl and the aromatic group may be substituted by substituent groups such as nitro, chloro, alcohoxy, azide and sulfonazide groups. Examples of the compounds to be used as an acid halide are benzoyl chloride, cinnamoyl, chloride, m-nitrocinnamoyl chloride, p-chlorocinnamoyl chloride, p-methoxycinnamoyl chloride, p-azidobenzoyl chloride, p-sulfonazido benzoyl chloride, α-cyanocinnamoyl chloride, cinnamilideneacetyl chloride, α-cyanocinnamilideneacetyl chloride, β-(1)-naphthylacryloyl chloride, β-(2)naphthylacryloyl chloride, β-(9)-anthorylacryloyl chloride, β-(2)-furfurylacryloyl chloride, α-cyano-β-(2)-furfurylacryloyl chloride, β-(2)-thienylacryloyl chloride, etc.

The esterification according to this invention may be performed in a heterogeneous or a homogeneous system. A polyglycidol is soluble in water but insoluble in general organic solvents such as benzene and dichloroethane. It is also soluble in aprotic polar solvents such as dimethylformamide, dimethylsulfoxide, hexamethylphosphoroamide and N-methylpyrrolidone. The reaction in a homogeneous system may be carried out in an aprotic polar solvent and the reaction in a heterogeneous system may be conducted by Schotten-Baumann reaction. The reaction is performed, under the usual temperature condition of this kind of reaction, by using a slight excess of acid halide to the hydroxide group of the polyglycidol in case of a complete esterification of polyglycidol, and by using less acid halide than the chemical equivalent of the hydroxide group in case of the maintenance of the water-solubility of the resultant ester. Generally, esters are made insoluble in water by the use of about 0.8 to 1.5 chemical equivalents of acid halide to the hydroxide group, and still soluble in water by the use of about 0.5 chemical equivalents of acid halide.

The properties of the resultant polyglycidyl ester varies with its kind, its esterification value, etc. but generally it is soluble in acetone, methylethylketone, dimethylformamide, dimethylsulfoxide, hexamethylphosphoroamide, tetrahydrofuran, etc. and insoluble in alcohols and aliphatic hydrocarbons such as n-hexane.

These novel esters have film forming capacity and many of them are photosensitive resins, so that they may be used as photosensitive films. Moreover, esters which are soluble in organic solvents may also be used as photosensitive varnishes, paints, etc.

When used as photosensitive resin, the ester of polyvinyl alcohol cinnamic acid, known as a photosensitive resin has a softening point of not less than 100°C., is very brittle and soluble in solvents such as methylethylketone and cyclohexane but its solubility in acetone, which is an important solvent, is low. In contrast polyglycidyl ester obtained by this invention is advantageously employed because of its flexibility in the form of films and its acetone-solubility.

This embodiment of the instant invention will now be described in detail by reference to the following illustrative examples:

EXAMPLE 1

0.5 ml. of boron-trifluoride diethylether dissolved in 10 ml. of dichloroethane were added to 54 g. of glycidol dissolved in 200 ml. of dichloroethane at 17°C. An exothermic polymerization then occurred rapidly and the resultant polyglycidol was precipitated. The catalyst was killed by dissolving the polymer in 50 ml. of weak ammoniacal water. After drying the polymer out of which the water was distilled under a reduced pressure, 52 g. of polyglycidol ($[\eta]=0.068$) were obtained.

Polyglycidols are soluble in water, dimethylformamide, hexamethylphosphoroamide, etc. and used for esterification by being dissolved in these solvents.

10 ml. of an aqueous solution of 1.1 g. of the thus obtained polyglycidol (15 millimole of glycidol), 5 ml. (concentration; 4 mol/l.) of an aqueous solution of sodium hydroxide and 10 ml. of methylethylketone were put into a flask, and 2.5 g. (18 millimole) of benzoyl chloride dissolved in 10 ml. of toluene were added to the mixture with a vigorous stirring and cooling. After the reaction proceeded for 2 hours at −4 to 0°C., the organic phase was separated from the product, washed and added to 300 ml. of methanol for the reprecipitation of the polymer. 3.4 g. of polyglycidyl ester of benzoic acid were then obtained.

Elementary analysis values of this product for $(C_{10}H_{10}C)_n$
Calc.    C 67.42% ; H 5.62%
Found    C 65.39% ; H 5.68%

EXAMPLE 2

50. ml. of an aqueous solution of 5.5 g. (74 millimole) of the same polyglycidol as in Example 1, 50 ml. (4 mole/l.) of an aqueous solution of sodium hydroxide and 50 ml. of toluene were put into a flask, and 15 g. (90 millimole) of cinnamoyl chloride dissolved in 50 ml. of toluene were added to the mixture with a vigorous stirring and cooling. After 1 hour of the reaction at −4 to 0°C., the organic phase was separated from the product, washed and added to 500 ml. of n-hexane for the reprecipitation of the polymer. 15.9 g. of polyglycidyl ester of cinnamic acid were then obtained.

Elementary analysis values of this product for $(C_{12}H_{12}O_3)_n$
Calc.    C 70.59% ; H 5.88%
Found.   C 69.87% ; H 5.93%

EXAMPLE 3

7.0 g. (42 millimole) of cinnamoyl chloride were added to 2.7 g. (36 millimole) of the same polyglycidol as in Example 1 dissolved in 10 ml. of hexamethyl phosphoroamide and the mixture was reacted for 5 hours. After the reaction, the polymer was precipitated, when the product was added to 1 l. of water. 3.8 g. of polyglycidyl ester of cinnamic acid were then obtained.

EXAMPLE 4

20 ml. of an aqueous solution of 2.2 g. (30 millimole) of the same polyglycidol as in Example 1, 20 ml. (2 mole/l.) of an aqueous solution of sodium hydroxide and 20 ml. of methylethylketone were put into a flask, and 7.6 g. (36 millimole) of m-nitrocinnamoyl chloride dissolved in 20 ml. of toluene were added to the mixture with vigorous stirring and cooling. After the reaction proceeded for 2 hour at −4 to 0°C., the organic phase was separated from the product, washed and added to 750 ml. of methanol for the reprecipitation of the polymer. 5.8 g. of polyglycidyl ester of m-nitrocinnamic acid were then obtained.

Elementary analysis values of this product for $(C_{14}H_{13}O_5N)_n$
Calc.    C 57.83% ; H 4.42% ; N 5.62%
Found.   C 58.33% ; H 4.28% ; N 5.73%

EXAMPLE 5

8.4 g. (44 millimole) of α-cyanocinnamoyl chloride dissolved in 25 ml. of hexamethylphosphoramide were added to 2.7 g. (36 millimole) of the same polyglycidol as in Example 1 dissolved in 50 ml. of hexamethylphosphoroamide with vigorous stirring and cooling, and the mixture was reacted for 5 hours. After the reaction, the polymer was precipitated, when the product was added to 2 L. of water. This precipitate was then dissolved in 100 ml. of acetone and again added to 1 l. of water for the reprecipitation of the polymer. 2.1 g. of polyglycidyl ester of α-cyanocinnamic acid were obtained.

Elementary analysis values of this product for $(C_{13}H_{11}O_3N)_n$
Calc.    C 68.12% ; H 4.80% ; N 6.11%
Found.   C 65.54% ; H 5.03% ; N 5.98%

EXAMPLE 6

20 ml. of an aqueous solution of 2.2 g. (30 millimole) of the same polyglycidol as in Example 1, 20 ml. (4 mole/l.) of an aqueous solution of sodium hydroxide and 20 ml. of methylethylketone were put into a flask, and 6.9 g. (36 millimole) of cinnamilidenacetyl chloride were added to the mixture with vigorous stirring and cooling. After the reaction proceeded for 2 hours at −4 to 1°C., the organic phase was separated from the product, washed and added to 750 ml. of methanol for the reprecipitation of the polymer. 3.8 g. of polyglycidyl ester of cinnamilidenacetic acid were then obtained.

Elementary analysis values of this product for $(C_{14}H_{14}O_3)_n$
Calc.    C 73.04% ; H 6.09%
Found.   C 72.11% ; H 6.14%

EXAMPLE 7

16 ml. of an aqueous solution of 1.8 g. (24 millimole) of the same polyglycidol as in Example 1, 15 ml. (4mole/l.) of an aqueous solution of sodium hydroxide and 10 ml of methylethylketone were put into a flask, and 6.2 g. (29 millimole) of β-(1)-naphthylacryloyl chloride were added to the mixture with vigorous stirring and cooling. After the reaction proceeded for 1.5 hours at −4 to 0°C., the organic phase was separated from the product, washed and added into 500 ml. of methanol for the reprecipitation of the polymer. 2.7 g. of polyglycidyl ester of β-(1)-naphthylacrylic acid were obtained.

Elementary analysis values of this product for $(C_{16}H_{14}O_3)_n$
Calc.    C 75.59% ; H 5.51%
Found.   C 77.78% ; H 5.63%

EXAMPLE 8

50 ml. of an aqueous solution of 5.55 g. (74 millimole) of the same polyglycidol as in Example 1, 50 ml. (4mole/l.) of an aqueous solution of sodium hydroxide and 50 ml. of methylethylketone were put into a flask, and 18.9 g. (89 millimole) of 2-furfurylacryloyl chloride dissolved in 50 ml. of toluene were added to the mixture with vigorous stirring and cooling. After the reaction proceeded for 1 hour at −3 to 2°C., the organic phase was separated from the product, washed and added to 1 l. of methanol for the reprecipitation of the polymer. 8.7 g. of polyglycidyl ester of 2-furfurylacrylic acid were then obtained.

Elementary analysis values of this product for $(C_{10}H_{10}O_4)_n$
Calc.   C 61.84% ; H 5.16%
Found.  C 60.52% ; H 5.38%

EXAMPLE 9

10 ml. of an aqueous solution of 1.1 g. (15 millimole) of the same polyglycidol as in Example 1, 10 ml. (4 mole/l.) of an aqueous solution of sodium hydroxide and 10 ml. of methylethylketone were put into a flask, and 3.1 g. (18 millimole) of 2-thienylacryloyl chloride dissolved in 10 ml. of toluene were added to the mixture with vigorous stirring and cooling. After the reaction proceeded for 2 hours at −2 to 3°C., the organic phase was separated from the product, washed and added into 300 ml. of methanol for the reprecipitation of the polymer. 1.8 g. of polyglycidyl ester of 2-thienylacrylic acid were then obtained.

Elementary analysis values of this product for $(C_{10}H_{10}O_3S)_n$
Calc.   C 57.14% ; H 4.76% ; S 15.24%
Found.  C 55.58% ; H 4.82% ; S 14.96%

The above clearly illustrates the production of a novel polyglycidyl ester according to this invention.

According to a further feature hereof similar concepts may be used to produce a polymeric ester with photosensitive properties by reacting a polyacrylate having the following general formula:

(6)

wherein $R_1$ is hydrogen, a low molecular weight alkyl group, a nitrile group or halogen and $R_2$ is an aliphatic radical having a hydroxyl group, with an acid halide having the following general formula:

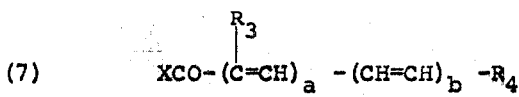

(7)

wherein $R_3$ is hydrogen or a nitrile group, $R_4$ is an aromatic group, X is a halogen and $a$ and $b$ are 0 or 1.

Examples of $R_1$ of the unit of the polyacrylate are hydrogen, methyl, ethyl, nitrile groups, chlorine, etc. and those of $R_2$ are 2-hydroxyethyl, 2-hydroxypropyl, 3-hydroxypropyl, 2,3-dihydroxypropyl, 2-(β-hydroxyethoxy)-ethyl groups, etc. Exemplary polyacrylates are homopolymers of acrylates such as 2-hydroxyethylacrylate, 2-hydroxypropylacrylate, 3-hydroxypropylacrylate, 2-hydroxyethylmethacrylate, 2-hydroxypropylmethacrylate, 3-hydroxypropylmethacrylate, 2-hydroxyethyl-α-chloroacrylate, 2-hydroxyethyl-α-cyanoacrylate, 2-hydroxypropyl-α-chloroacrylate, diethyleneglycolmonoacrylate, diethyleneglycolmonomethacrylate and 2,3-dihydroxypropylacrylate, copolymers of these acrylates with other vinyl compounds such as acrylic acid, alkylacrylate, methylmethacrylate, acrylonitrile, acrylamide, vinylchloride, vinlidenechloride, vinyl acetate, styrene, α-methylstyrene, p-methoxystyrene, isobutylvinyl ether, 2-chloroethylvinyl ether, phenylvinyl ether and arylglycidylether, or copolymers of these acrylates with diolefin compounds such as butadiene, isoprene and chloroprene.

$R_4$ is exemplified by the groups set forth hereinabove with respect to $R_2$ of formula (2).

In a reaction of a polyacrylate with an acid halide, a slightly excess of acid halide to the hydroxyl group of the polyacrylate is generally used, that is to say, in an acid halide to hydroxyl group chemical equivalent ratio of from about 1.1 to 1.3. The esterification of the hydroxyl group is carried out almost completely under such a condition. The partial esterification of of the hydroxyl group may also be conducted and in this case acid halide of less chemical equivalent may be used.

The esterification may be performed in a homogeneous or a hetrogeneous system. Homopolymers and copolymers of acrylate having a hydroxyl group are insoluble in general organic solvents but soluble in aprotic polar solvents such as dimethylformamide, diethylformamide, diethylacetoamide, dimethylsulfoxide, hexamethylphosphoroamide and N-methylpyrrolidone. A reaction in the homogeneous system may be conducted by dissolving a polyacrylate and an acid halide in one of these aprotic polar solvents. Or an acid halide may directly be added to the polyacrylate dissolved in the solvent or a tertiary amine, such as pyridine, may also be used as a dehydrogenhalide agent. Reactions in the heterogeneous system are, for example, one in which a polyacrylate is added to pyridine etc. for swelling, followed by the addition of an acid halide for the reaction therewith or a Schotten Baumann reaction in which an acid halide dissolved in a solvent immissible with water such as toluene, methylethylketone, monochlorobenzene and cyclohexanone is added to an aqueous solution of a polyacrylate in the presence of a basic substance. For the Schotten Baumann reaction an aqueous solution of the polymer obtained by the polymerization of the acrylate may also be employed without a special treatment thereof.

The properties of this novel polymeric ester vary with the kind of a newly substituted ester group, but generally it is soluble in solvents such as acetone, methylethylketone, dimethylformamide, hexamethylphosphoroamide and tetrahydrofuran, and insoluble in solvents such as alcohols and hydrocarbons. Also, the obtained polymeric ester has film-forming capacity. For example, when an acetone solution of a cinnamic acid ester of poly-2-hydroxyethylacrylate is flowed on mercury to distil out an acetone solvent, a flexible strong film is obtained.

It was confirmed that by the observation of the tensile strength of the obtained film on the copper surface by Erichsen film tester, there were cracks on the copper sheet at D=8.5 mm., while the film showed neither cracks nor breaks but showed sufficient resistance to the applied tensile strength of this value without peeling from the copper surface.

Further, the obtained ester except non-substituted benzoate (a=b=0) has photosensitivity and it is useful in photosensitive resins, varnishes, paints, etc. because it turns insoluble in the presence of light.

In contrast with the use of the cinnamic acid ester of polyvinyl alcohol as a photosensitive resin, which, as mentioned above, has a softening point of not less than 100°C., is very brittle, and soluble in solvents such as methylethylketone and cyclohexane but its solubility in acetone, which is an important solvent, is low, the polymeric ester hereof is advantageously employed because of its softening point of not more than 100°C., its flexibility in the form of films and its acetone-solubility. The photosensitivity of the obtained polymeric ester tends to be higher in the presence of $\alpha$-nitrile, cinnamilidene groups, furan, thiophene rings, etc. in generally introduced ester groups.

In the case of a photosensitive film obtained from the polymers of acrylic acid esters of this invention applied on a non-metallic base such as polyester film, polypropylene film, it shows a very interesting phenomenon in which the photosensitive film is easily laminated onto a metallic base such as a copper sheet, an aluminum sheet and a zinc sheet. That is to say, the photosensitive film layer on the non-metallic base is easily laminated onto the metallic base by putting the metallic base on the surface of the film and pressing the lamination at a temperature of more than the glass transition temperature. The bond between the photosensitive film and the metallic base is maintained without the use of an adhesive, while the bond between the photosensitive film and the non-metallic base is loose to the extent that the non-metallic base can easily peel from the film layer by hand but it is maintained unless the base is intentionally peeled from the layer.

Such photosensitive lamination comprising a metallic base, a photosensitive film and a non-metallic base has a very important utility. That is to say, the non-metallic base works as a protective base when the lamination is used as a photosensitized plate, further in the case of a shading non-metallic base, the photosensitization of the lamination during its preservation is difficult. Therefore, a quality lamination of a stable photosensitivity can be supplied to customers in the form of a photosensitized plate. The photosensitive lamination, with or without the non-metallic protective base, has a good photosensitivity, although such protective base is preferred to protect the lamination. Practically, the photosensitive lamination will be supplied to a customer with the protective base on the film. The base is peeled off in actual use.

In the use of a lamination with a photosensitive film formed on the metallic or non-metallic base, a negative is put on the film. Then this is exposed to a chemical lamp, etc. and after the exposure, the unexposed areas of the film are dissolved and washed away with a solvent, such a monochlorobenzene, which dissolve polyacrylate used for film forming. As a result, the exposed areas leave the opposite images to those of the negative because the exposed areas are cross-linked to become insoluble in the solvent. Further, in the use of a sheet metal as the base, the metallic base can be etched with an etching agent such as an aqueous solution of ferric chloride, and the exposed areas are sufficiently resistant to the etching agent, thus giving clear images.

Further examples of this embodiment of the instant inventive concepts are as follows:

EXAMPLE A 0.08 g. of azobisisobutylnitrile were added to 75 g. of 2-hydroxyethylacrylate (HEA) dissolved in 150 ml. of hexamethylphosphoroamide and the mixture was polymerized in $N_2$ gas for 1 hour at 60°C. and further for 2 hours at 80°C. Poly-2-hydroxyethylacrylate (PHEA) was then obtained. ($[\eta]$=0.60)

EXAMPLE B 0.9 g. of potassium persulfate were added to 90 g. of 2-hydroxy-ethylacrylate (HEA) dissolved in 900 ml. of water and the mixture was polymerized in $N_2$ gas at 60 °C for 1 hour. After the reaction the product was added to 3 L. of acetone for the precipitation of the polymer. 81 g. of poly-2-hydroxyethylacrylate (PHEA) were then obtained. ($[\eta]$=0.93)

EXAMPLE C 0.05 g. of azobisisobutylnitrile were added to 50 g. of 2-hydroxyethylacrylate (HEA) dissolved in 200 ml. of dimethylformamide and the mixture was polymerized in $N_2$ gas for 3 hours at 65°C. and further for 2 hours at 80°C. Poly-2-hydroxyethylacrylate (PHEA) was then obained. ($[\eta]$=0.43)

EXAMPLE D 0.15 g. of azobisisobutylnitrile were added to 150 g. of 2-hydroxypropylacrylate (HPA) dissolved in 150 ml. of hexamethylphosphoroamide and the mixture was polymerized in $N_2$ gas for 1 hour at 60°C. and further for 1 hour at 80°C. Poly-2-hydroxypropylacrylate (PHPA) was then obtained. ($[\eta]$=0.77)

EXAMPLE E 0.5 g. of azobisisobutylnitrile were added to 50 g. of 2-hydroxypropylmethacrylate dissolved in 180 ml. of hexamethylphosphoroamide and the mixture was polymerized in $N_2$ gas for 3 hours at 60°C. Poly-2-hydroxypropylmethacrylate was then obtained. ($[\eta]$=0.43)

EXAMPLE F 0.2 g. of azobisisobutylnitrile were added to 75 g. of 2-hydroxyethylacrylate and 25 g. of n-butylacrylate both dissolved in 300 ml. of hexamethylphosphoroamide and the mixture was polymerized in $N_2$ gas for 3 hours at 60°C. and further for 2 hours at 80°C. 2-hydroxyethylacrylate-n-butylacrylate copolymer was then obtained.

EXAMPLE G 0.5 g. of azobisisobutylonitrile were added to 40 g. of 2-hydroxyethylacrylate and 10 g. of n-butylacrylate both dissolved in 40 ml. of dimethylsulfoxide and the mixture was polymerized in $N_2$ gas for 3 hours at 60°C. and further for 2 hours at 80°C. 2-hydroyethylacrylate-n-butylacrylate copolymer was then obtained.

EXAMPLE H 0.1 g. of azobisisobutylnitrile were added to 75 g. of 2-hydroxyethylacrylate and 75 g. of styrene both dissolved in 150 ml. of hexamethylphosphoroamide and the mixture was polymerized in $N_2$ gas for 3 hours at 60°C. and further for 2 hours at 80°C. 2-hydroxyethylacrylate-styrene copolymer was then obtained. ($[\eta]$=0.62)

EXAMPLE 10

12.9 g. of cinnamoyl chloride dissolved in 50 ml. of hexamethylphosphoroamide were added, with stirring, to 7.5 g. of PHEA obtained in Example A dissolved in 100 ml. of hexamethylphosphoroamide and the mixture was reacted at 50°C. for 5 hours. After the reaction the product was added into 1.5 l. of water for the precipitation of the polymer. The obtained polymer was again dissolved in 200 ml. of acetone and the solution was added into 1.5 l. of water for reprecipitation. 9.0 g. of the ester of PHEA-cinnamic acid were then obtained.

It was confirmed from the results of an elementary analysis, I.R. spectrum and N.M.R. spectrum observations of the obtained polymeric ester that it was completely esterificated, that is to say, with neither absorption of a hydroxide group shown in the I.R. spectrum between 3500–3400 cm.$^{-1}$ nor chemical shift of an alcoholic hydroxide group shown in the N.M.R. spectrum.

Elementary analysis of this product for $(C_{14}H_{14})_4)_n$
Calc.   C : 68.29% , H : 5.69%
Found.  C : 66.98% , H : 5.67%

EXAMPLE 11

1.5 g. of the cinnamate ester of PHEA obtained in Example 10 dissolved in 7.5 ml. of cyclohexanone were applied on the surface of a sheet glass by a whirling applying device. After drying it, a film of 1$\mu$ thickness was obtainted on the glass surface.

A step tablet No. 2 (made by Kodak Company) with 21 stepped images was put on the produced photosensitive film on the surface of the sheet glass and it was exposed for a period of 21 minutes to 40 watt chemical lamp at a distance of 10 cm. After the exposure the unexposed areas of the photosensitive film were dissolved and washed away with monochlorobenzene. As a result, on the sheet glass the images were printed, of which those up to the third step were distinguishable.

EXAMPLE 12

1.5 g. of the cinnamate ester of PHEA obtained in Example 10 and 0.12 g. of 5-nitroacenaphtene as a sensitizer, both dissolved in 7.5 ml. of cyclohexanone, were applied on the surface of a sheet glass by a whirling applying device. After drying them, a film of less than 1 $\mu$ thickness was obtained on the surface of the sheet glass.

A step tablet No. 2 (made by Kodak Company) with 21 stepped images was then put on the resultant photosensitive film on the glass surface and it was exposed for a period of 4 minutes to a 40 watt chemical lamp at a distance of 10 cm. After the exposure, the unexposed areas of the photosensitive film were dissolved and washed away with monochlorobenzene. As a result, on the sheet glass the images were printed, of which those up to the 17th step were distinguisable.

The same result was obtained when N-acetyl-4-nitro-1-naphthylamine or 4,4'-(bisdimethylamino)benzophenone was employed as the sensitizer in the place of 5-nitroacenaphthene.

EXAMPLE 13

A copper sheet was coated with 3.0 g. of the cinnamate ester of PHEA obtained in Example 10 and 0.24 g. of 5-nitroacenaphthene, both dissolved in 15 ml. of cyclohexanone, to give a film thickness of 100 $\mu$ by using a knife-coater. After drying thus provided coating at 50°C. for 1 hour, a film of 12 $\mu$ thickness was obtained on the copper surface.

A negative was then put on the obtained photosensitive film on the copper surface and it was exposed for a period of 4 minutes to a 40 watt chemical lamp at a distance of 10 cm. After the exposure the unexposed areas of the film were dissolved and washed away with monochlorobenzene. Then, this film was treated with an aqueous solution of ferric chloride for etching. The insoluble areas of the film were sufficiently resistant to the etching solution and clear images on the copper were obtained It was confirmed that by the observation of the strength of the film having 12 $\mu$ thickness on the copper surface by Erichsen film tester, there were cracks on the copper sheet at D=8.5 mm., while the film did not show cracks but showed sufficient resistance to the applied stress of this value.

EXAMPLE 14

A polyester film was coated with 3.0 g. of the cinnamate ester of PHEA obtained in Example 10 and 0.24 g. of 5-nitroacenaphthene as a sensitizer both dissolved in 15 ml. of cyclohexanone to give a film thickness of 100 $\mu$, by using a knife-coater. After drying thus formed coating at 50°C. for 1 hour, a film of 12 $\mu$ thickness was obtained on the polyester film surface.

The photosensitive film layer on the polyester film surface was well laminated to the surface of a copper sheet using heated pressure rollers at a temperature of 100°C. and the polyester film was easily peeled from the photosensitive film layer.

A polypropylene film used in place of the polyester one also showed a successful result.

EXAMPLE 15

20 ml. of pyridine were added to 10.0 g. of PHEA obtained in Example C dissolved in 100 ml. of dimethylformamide. 17.2 g. of cinnamoyl chloride dissolved in 50 ml. of dimethylformamide were added with stirring to and reacted with the mixture at 50°C. for 5 hours. After the reaction the product was added into 2 l. of methanol for the precipitation of the polymer. 13.5 g. of the ester of PHEA-cinnamic acid were then obtained.

EXAMPLE 16

50 ml. of methylethylketone and 50 ml. of an aqueous solution of sodium hydroxide (concentration 2 mole/l.) were added to 3.64 g. of PHEA obtained in Example B dissolved in 50 ml. of water and the mixture was cooled to −3°C. 7.0 g. of cinnamoyl chloride dissolved in 50 ml. of methylethylketone were added, with stirring, to and reacted with the mixture at −5° to 4°C. for 1 hour. After the reaction the organic phase of the product was added into 1 l. of methanol for the precipitation of the polymer. 5.8 g. of the ester of PHEA-cinnamic acid were then obtained.

EXAMPLE 17

11.5 g. of cinnamoyl chloride dissolved in 50 ml. of hexamethylphosphoroamide were added to 7.5 g. of PHEA obtained in Example D dissolved in 100 ml. of hexamethylphosphoroamide and the mixture was reacted at 50°C. for 5 hours. After the reaction the product was added into 1.5 l. of water for the precipitation of the polymer. The polymer was dissolved again in 200 ml. of tetrahydrofuran and the solution was added into 1.5 l. of water for reprecipitation. 11.3 g. of the ester of PHPA-cinnamic acid were then obtained.

It was confirmed from the results of an elementary analysis, I.R. spectrum and N.M.R. spectrum observations of obtained polymeric ester that it was completely esterificated, that is to say, with neither absorption of a hydroxide group shown in the I.R. spectrum between 3500–3400 cm.$^{-1}$ nor chemical shift of an alcoholic hydroxide group shown in the N.M.R. spectrum.

Elementary analysis of this product for $(C_{15}H_{16}O_4)_n$
Calc.     C : 69.23% , H : 6.15%
Found.   C : 67.98% , H : 5.99%

EXAMPLE 18

13.9 g. of cinnamoyl chloride dissolved in 50 ml. of hexamethylphosphoroamide were added to 10.0 g. of poly-2-hydroxypropylmethacrylate obtained in Example E disolved in 100 ml. of hexamethylphosphoroamide and the mixture was reacted at 60°C. for 4 hours. After the reaction the product was added into 2 l. of water for the precipitation of the polymer. The polymer was again disolved in 200 ml. of acetone and the solution was added into 2 l. of methanol for reprecipitation. 6.0 g. of the ester of poly-2-hydroxypropylmethacrylate-cinnamic acid were then obtained.

Elementary analysis of this product for $(C_{16}H_{18}O_4)_n$
Calc.     C : 70.10% , H : 6.57%
Found.   C : 68.03% , H : 6.87%

EXAMPLE 19

9.8 g. of m-nitrocinnamoyl chloride dissolved in 30 ml. of hexamethylphosphoroamide were added to 4.5 g. of PHEA obtained in Example A dissolved in 30 ml. of hexamethylphosphoroamide and the mixture was reacted at 50°C. for 5 hours. After the reaction the product was added into 2 l. of water for the precipitation of the polymer. The polymer was again dissolved in 300 ml. of acetone and the solution was added into 2 l. of methanol for reprecipitation. 6.7 g. of the ester of PHEA-m-nitrocinnamic acid were then obtained.

Elementary analysis of this product for $(C_{14}H_{13}O_6)_n$
Calc.     C : 57.72% , H : 4.47% , N : 4.81%
Found.   C : 56.56% , H : 4.21%, N : 4.79%

EXAMPLE 20

9.7 g. of p-chlorocinnamoyl chloride dissolved in 20 ml. of hexamethylphosphoroamide were added to 4.64 g. of PHEA obtained in Example A dissolved in 60 ml. of hexamethylphosphoroamide and the mixture was reacted at 50°C. for 5 hours. After the reaction the product was added into 2 l. of methanol for the precipitation of the polymer. The polymer was again dissolved in 100 ml. of methylethylketone and the solution was added into 2 l. of methanol for reprecipitation and purification. 5.7 g. of PHEA-p-chlorocinnamic acid were then obtained.

Elementary analysis of this product for $(C_{14}H_{13}O_4Cl)_n$
Calc.     C : 59.89%     H : 4.63%     Cl : 12.66%
Found.   C : 57.96%     H : 4.38%     Cl : 12.43%

EXAMPLE 21

14.8 g. of α-cyanocinnamoyl chloride dissolved in 50 ml. of hexamethylphosphoroamide were added to 7.5 g. of PHEA obtained in Example A dissolved in 100 ml. of hexamethylphosphoroamide with stirring and the mixture was reacted at 50°C. for 5 hours. After the reaction the product was added into 2 l. of water for the precipitation of the polymer. The polymer was dissolved in 200 ml. of acetone and the solution was added into 1 l. of methanol for reprecipitation. 9.0 g. of the ester of PHEA-α-cyanocinnamic acid were then obtained.

Elementary analysis of this product for $(C_{15}H_{13}O_4N)_n$
Calc.     C : 66.42%     H : 4.80%     N : 5.17%
Found.   C : 64.84%     H : 4.96%     N : 4.99

EXAMPLE 22

13.3 g. of α-cyanocinnamoyl chloride dissolved in 100 ml. of hexamethylphosphoroamide were added to 7.5 g. of PHPA obtained in Example D dissolved in 100 ml. of hexamethylphosphoroamide with stirring and the mixture was reacted at 50°C. for 5 hours. After the reaction the product was added into 2 l. of water for the precipitation of the polymer. The polymer was again dissolved in 200 ml. of acetone and the solution was added into 2 l. of methanol for the precipitation. 8.2 g. of the ester of PHPA-α-cyanocinnamic acid were then obtained.

Elementary analysis of this product for $(C_{16}H_{15}O_4N)_n$
Calc     C : 67.37%     H : 5.26%     N : 4.91%
Found.   C : 67.56%     H : 5.84%     N : 4.26%

EXAMPLE 23

9.0 g. of cinnamilidenacetyl chloride dissolved in 30 ml. of hexamethylphosphoroamide were added to 4.5 g. of PHEA obtained in Example A dissolved in 60 ml. of hexamethylphosphoroamide with stirring and the mixture was reacted at 50°C. for 5 hours. After the reaction the product was added into 2 l. of water for the precipitation of the polymer. The polymer was again dissolved in 200 ml. of acetone and the solution was added into 2 l. of methanol for reprecipitation. 5.4 g. of the ester of PHEA-cinnamilidenacetic acid were then obtained.

Elementary analysis of this product for $(C_{16}H_{16}O_4)_n$
Calc.      C : 70.60%    H : 5.88%
Found.     C : 68.72%    H : 5.98%

EXAMPLE 24

3.0 g. of the cinnamilidenacetate ester of PHEA obtained in Example 23 and 0.24 g. of 5-nitroacenaphthene as a sensitizer, both dissolved in 15 ml. of cyclohexanone, were applied onto the surface of a sheet glass by a whirling applying device. After drying them, a film of less than 1 $\mu$ thickness was obtained on the surface of the sheet glass.

The exposure was carried out in a similar way to Example 12 for a period of 2 minutes to a chemical lamp. As a result, on the sheet glass the images of the step tablet were printed, of which those up to the third step were distinguishable.

EXAMPLE 25

10.1 g. of α-cyanocinnamilidenacetyl chloride dissolved in 30 ml. of hexamethylphosphoroamide were added to 4.5 g. of PHEA obtained in Example A dissolved in 60 ml. of hexamethylphosphoroamide with stirring and the mixture was reacted at 50°C. for 5 hours. After the reaction the product was added into 2 l. of water for the precipitation of the polymer. The polymer was again dissolved in 200 ml. of acetone and then the solution was added into 2 l. of methanol for reprecipitation. 9.0 g. of the ester of PHEA-α-cyanocinnamilidenacetic acid were then obtained.

Elementary analysis of this product for $(C_{17}H_{15}O_4N)_n$
Calc.      C : 68.69%    H : 5.05%    N : 4.71%
Found.     C : 67.43%    H : 5.73%    N : 4.25%

EXAMPLE 26

10.7 g. of β-(1)-naphthylacryloyl chloride dissolved in 30 ml. of hexamethylphosphoroamide were added to 4.5 g. of PHEA obtained in Example A dissolved in 60 ml. of hexamethylphosphoroamide with stirring and the mixture was reacted at 50°C. for 5 hours. After the reaction, the product was added into 2 l. of water for the precipitation of the polymer. The polymer was again dissolved in 200 ml. of acetone and the solution was added into 2 l. of methanol for reprecipitation. 7.1 g. of the ester of PHEA-β-(1)-naphthylacrylic acid were then obtained.

Elementary analysis of this product for $(C_{16}H_{14}O_4)_n$
Calc.      C : 71.19%    H : 5.19%
Found.     C : 69.98%    H : 5.41%

EXAMPLE 27

11.1 g. of β-(2)-furfurylacryloyl chloride dissolved in 50 ml. of hexamethylphosphoroamide were added to 7.5 g. of PHEA obtained in Example A dissolved in 100 ml. of hexamethylphosphoroamide with stirring and the mixture was reacted at 50°C. for 5 hours. After the reaction the product was added into 2 l. of water for the precipitation of the polymer. The polymer was again dissolved in 300 ml. of acetone and the solution was added into 2 l. of methanol for reprecipitation. 5.8 g. of the ester of PHEA-β-(2)-furfurylacrylic acid were then obtained.

Elementary analysis of this product for $(C_{12}H_{12}O_5)_n$
Calc.      C : 61.01%    H : 5.09%
Found.     C : 61.15%    H : 4.83%

EXAMPLE 28

14.0 g. of α-cyano-β-(2)-furfurylacryloyl chloride dissolved in 50 ml. of hexamethylphosphoroamide were added to 7.5 g. of PHEA obtained in Example A dissolved in 100 ml. of hexamethylphosphoroamide with stirring and the mixture was reacted at 50°C. for 5 hours. After the reaction the product was added into 2 l. of n-hexane for the precipitation of the polymer. The polymer was again dissolved in 100 ml. of acetone and the solution was added into 5 l. of water for reprecipitation. 9.1 g. of the ester of PHEA-α-cyano-β-(2)-furfurylacrylic acid were then obtained.

Elementary analysis of this product for $(C_{13}H_{11}O_5N)_n$
Calc.      C : 59.79%    H : 4.22%    N : 5.36%
Found.     C : 58.67%    H : 4.54%    N : 5.11%

EXAMPLE 29

8.6 g. of 2-thienylacryloyl chloride dissolved in 30 ml. of hexamethylphosphoroamide were added to 4.6 g. of PHEA obtained in Example A dissolved in 60 ml. of hexamethylphosphoroamide with stirring and the mixture was reacted at 50°C. for 5 hours. After the reaction the product was added into 1.7 l. of methanol for the precipitation of the polymer. 5.7 g. of the ester of PHEA-2-thienylacrylic acid were obtained.

Elementary analysis of this product for $(C_{12}H_{13}O_4S)_n$
Calc.      C : 57.14%    H : 4.76%    S : 12.70%
Found.     C : 57.03%    H : 4.52%    S : 12.54%

EXAMPLE 30

1.48 g. of cinnamoyl chloride dissolved in 20 ml. of hexamethylphosphoroamide were added to 10.0 g. of 2-hydroxyethylacrylate-n-butylacrylate copolymer obtained in Example F dissolved in 50 ml. of hexamethylophosphoroamide with stirring and the mixtire was reacted at 55°C. for 5 hours. After the reaction the product was added into 2 l. l. water for the precipitation of the polymer. The polymer was again dissolved in 100 ml. of acetone and the solution was added into 1.5 l. of methanol for reprecipitation, 9.5 g. of the copolymer of n-butylacrylate-2-hydroxyethylacrylate ester of cinnamic acid were then obtained.

EXAMPLE 31

5 ml. of pyridine were added to 5.0 g. of 2-hydroxyethylacrylate-n-butylacrylate copolymer obtained in Example G dissolved in 50 ml. of dimethylsulfoxide and 6.9 g. of cinnamoyl chloride dissolved in 20 ml. of chloroform were added with stirring to and reacted with the mixture of 30°C. for 5 hours. After the reaction the product was added into 1 l. of water for precipitation of the polymer. 5.8 g. of the copolymer of n-butylacrylate-2-hydroxyethylacrylate ester of cinnamic acid were then obtained.

EXAMPLE 32

14.8 g. of cinnamoyl chloride dissolved in 50 ml. of hexamethylphosphoroamide were added to 15.0 g. of 2-hydroxyethylacrylate-styrene copolymer obtained in Example H dissolved in 100 ml. of hexamethylphosphoroamide and the mixture was reacted at 50°C. for 5 hours. After the reaction the product was added into 2 l. of water for the precipitation of the polymer. The polymer was again dissolved in 200 ml. of acetone and the solution was added into 2 l. of methanol for reprecipitation. 40 g. of the copolymer of styrene-2-hydroxyethylacrylate ester of cinnamic acid were then obtained.

EXAMPLE 33

7.1 g. of benzoyl chloride dissolved in 30 ml. of hexamethylphosphoroamide were added to 4.64 g. of PHEA obtained in Example A dissolved in 60 ml. of hexamethylphosphoroamide and the mixture was reacted for 5 hours with keeping a reaction temperature at 50°C. After the reaction the product was added into 2 l. of water for the precipitation of the polymer. The polymer was again dissolved in 100 ml. of methylethylketone and the solution was added into 2 l. of water for reprecipitation. 3.6 g. of the ester of PHEA-benzoic acid were then obtained.

| | Elementary analysis of this product for $(C_{12}H_{12}O_4)_n$ | |
|---|---|---|
| Calc. | C : 65.45% | H : 5.45% |
| Found. | C : 63.32% | H : 5.55% |

EXAMPLE 34

9.5 g. of p-azidobenzoyl chloride dissolved in 50 ml. of hexamethylphosphoroamide were added to 5.8 g. of PHEA obtained in Example A dissolved in 50 ml. of hexamethylphosphoroamide and the mixture was reacted with keeping a temperature at 30°C. for 5 hours. After the reaction, the product was added to 500 ml. of methanol for the precipitation of the polymer. The polymer was again dissolved in 50 ml. of methylethylketone and the solution was added into 500 ml. of methanol for reprecipitation. 9.4 g. of the ester of PHEA-p-azidobenzoic acid, were then obtained.

Since the measurement of the I.R. and N.M.R. spectrums of the obtained polymer did not show the presence of an alcoholic hydroxide group, the esterification of the polymer believed to have progressed completely.

| Elementary analysis of this product for $(C_{12}H_{11}O_4N_3)_n$ | |
|---|---|
| Calc. | N : 16.09% |
| Found. | N : 15.99% |

EXAMPLE 35

4.0 g. of p-azidobenzoyl chloride dissolved in 15 ml. of dimethylformamide were added to 2.3 g. of PHEA obtained in Example A dissolved in 40 ml. of dimethylformamide and the mixture was reacted with keeping a temperature at room temperature for 5 hours. After the reaction, the product was added into 300 ml. of methanol for the precipitation of the polymer. The polymer was again dissolved in 20 ml. of methylethylketone and the solution was added into 300 ml. of methanol for reprecipitation. 1.1 g. of the ester of PHEA-p-azidobenzoic acid were then obtained.

EXAMPLE 36

4.0 g. of p-azidobenzoyl chloride dissolved in 15 ml. of hexamethylphosphoroamide were added to 2.9 g. of poly-2-hydroxypropylmethacrylate obtained in Example E dissolved in 50 ml. of hexamethylphosphoroamide and the mixture was reacted with keeping a temperature at 0°C. for 5 hours. After the reaction, the product was treated as in Example 35 and 3.5 g. of the ester of poly-2-hydroxypropylmethacrylate-p-azidobenzoic acid were then obtained.

| Elementary analysis of the product for $(C_{14}H_{15}O_4N_3)_n$ | |
|---|---|
| Calc. | N : 14.53% |
| Found. | N : 14.45% |

EXAMPLE 37

4.0 g. of p-azidobenzoyl chloride dissolved in 15 ml. of hexamethylphosphoroamide were added to 3.6 g. of 2-hydroxyethylacrylate-n-butylacrylate copolymer obtained in Example F dissolved in 25 ml. of hexamethylphosphoroamide and the mixture was reacted with keeping a temperature at 50°C. for 2 hours. After the reaction, the product was treated as in Example 35 and 2.0 g. of the copolymer of 2-hydroxyethylacrylate-n-butylacrylate ester of p-azidobenzoic acid were then obtained.

In each of the above mentioned Examples, the proportion of acid chloride to the hydroxide group contained in the polyacrylate was such that the former was in slight excess. That is to say, the chemical equivalent of the acid halide to that of a hydroxide group is 1.04 in Example 34, 1.10 in Examples 27, 35, 36 and 37, 1.25 in Examples 29 and 33, 1.30 in Example 16 and in the other Examples.

EXAMPLE 38

0.023 g. of azobisisobutylonitrile were added to 21.0 of 2-hydroxyethyl acrylate and 1.7 g. of vinyl acetate both dissolved in 25 ml. of hexamethylphosphoroamide and the mixture was reacted at 60′C. for 4 hours. The copolymer of 2-hydroxyethyl-acrylate-vinylacetate was obtained.

$$([\eta]=1.35)$$

After 75 ml. of hexamethylphosphoroamide were added to the reacted solution the mixture was reacted at 50°C. for 5 hours. The reacted solution was added into 3 l. of methanol for the precipitation of a polymer. The polymer was again dissolved in 150 ml. of methylethylketone for a reprecipitation. 25.8 g. of cinnamate ester of the copolymer of 2-hydroxyethylacrylate-vinylacetate were then obtained. ($T_g$=65°C)

EXAMPLE 39

The cinnamate ester of the copolymer of 2-hydroxyethyl-acrylate-vinylacetate obtained in Example 38 are treated in a similar way to Example 12. As a result, on the sheet glass the images of the step tablet were printed, of which those up to the 16th step were distinguishable.

The above Examples serve to illustrate the second embodiment of this invention.

As indicated previously, this invention also relates to the production of a polymeric ester by condensing a polymer having a chloromethyl group in its aliphatic side chain with a carboxyl salt.

In activity, the chlorine of the chloromethyl group of polymers having the same group in their aliphatic side chain such as homopolymers or copolymers of epichlorohydrin, vinylchloracetate, 2-chloroethylvinyl ether, 2-chloroethylacrylate and 3,3-bis-(chloromethyl)-oxtane is less than the bromine of bromomethyl groups and also than the chlorine of the chloromethyl group of p-chloromethylstyrene polymers, which, in contast, has a high activity. For that reason chlorine in the chloromethyl group of polymers having the same group in their aliphatic side chain is generally nearly chemically inert, leading to a rare situation in which the chlorine of chloromethyl groups is employed as a functional group in reaction with such materials.

It has now been found that the condensation reaction of a polymer having in its aliphatic side chain a chloromethyl group containing such inert chlorine with a carboxyl salt having the following general formula:

(8)   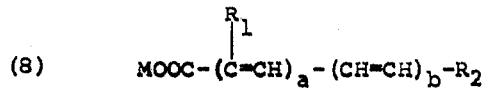

wherein $R_1$ represents hydrogen or a nitrile group, $R_2$ is an aromatic group, M is an ammonium group or an alkali metal, and $a$ and $b$ are 0 or 1 in an aprotic polar solvent proceeds very smoothly to prepare polymeric esters most of which have photosensitivity.

Examples of $R_2$ of a carboxyl salt such as represented by formula (8) are substituted or non-substituted aromatic groups such as phenyl, nitrophenyl, chlorophenyl, hydroxyphenyl, acetoxyphenyl or styrlylphenyl, with the substituted groups of the above phenyl rings being positioned in ortho, meta or para, 1-naphtyl, 2-naphthyl, 9-anthoryl, 2-furfuryl, 2-thienyl, 4-pyridil, p-azidophenyl, and p-sulfonazidophenyl groups. Examples of carboxylic acid forming ammonium salts or alkali metal salts used in this invention are benzoic acid, p-nitrobenzoic acid, p-azidobenzoic acid, cinnamic acid, m-nitrocinnamic acid, p-chlorocinnamic acid, p-methoxycinnamic acid, α-cyanocinnamic acid, cinnamilidenacetic acid, α-cyanocinnamilidenacetic acid, β-(1)-naphthylacrylic acid, β-(2)-naphthylacrylic acid, β-(9)-anthorylacrylic acid, β-(2)-furfurylacrylic acid, α-cyano-β-(2)-furfurylacrylic acid, β-(2)-thienylacrylic acid, β-(4)-pyridylacrylic acid and p-sulfonazidobenzoic acid, and these acids are employed in the condensation reaction in the form of ammonium, sodium, potassium salts, etc.

A chloromethyl group in the side chain of a polymer which is condensed with a carboxyl salt is generally monochloromethyl group, but hydrogen left in the methyl group may also be substituted by a halogen atom, an alkyl group, a hydroxyalkyl group, etc.

A condensation reaction of a polymer having the chloromethyl group in the aliphatic side chain with a carboxyl salt is performed by adding the carboxyl salt to the polymer dissolved in aprotic polar solvents such as hexamethyl-phosphoroamide, dimethylformamide, diethylformamide, dimethylacetoamide, dimethylsulfoxide and N-methylpyrrolidone. The condensation reaction proceeds smoothly without a catalyst depending on the type of the solvent, but generally proceeds at a high yield and a high esterification degree by the addition of a quaternary ammonium salt such as methyltriethylammonium iodide. In contrast, when a generally used inert organic solvent except aprotic polar ones is employed, an esterification reaction does not proceed at all, even if the solvent dissolves the polymer having a chloromethyl group.

In a reaction, a slight excess of carboxyl salt to the chemical equivalent of the chlorine of the polymer is generally employed but a polymeric ester usable for a photosensitive resin, is also obtained at a chemical equivalent of not less than 0.3. The obtained polymeric ester is soluble in generally used solvents such as acetone, benzene, toluene, chloroform, dimethylformamide, tetrahydrofuran and hexamethylphosphoroamide.

Again, as mentioned previously, when used as a photosensitive resin the ester of polyvinylalcohol-cinnamic acid, a known photosensitive resin, has a low film-forming capacity, is very brittle in the form of films, is soluble in solvents such as methylethylketone and cyclohexane and its solubility in acetone, which is an important solvent, is low. In contrast polymeric ester obtained by this embodiment of the instant inventive concepts is advantageously employed for its film-forming capacity, its flexibility in the form of films and its acetone-solubility.

In a method of preparing polymeric ester by this invention, when the chemical equivalent of carboxyl salt is less than that of chlorine in the chloromethyl group of the polymer to be esterified, an ester of a low esterification degree is obtained. It forms a kind of copolymer, so that a polymeric ester having necessary physical properties may be obtained by controlling the esterification degree.

Further Examples illustrating this embodiment are as follows:

EXAMPLES 40–58

A carboxyl salt and, if necessary, methyltriethylammonium iodide as a catalyst were added to a polymer having a chloromethyl group in the aliphatic side chain dissolved in an aprotic polar solvent and the mixture was reacted at a given temperature for given hours. After the reaction the reacted mixture was added into water for the precipitation of the product. The precipitate was dissolved in methylethylketone and the solution was again added into water for reprecipitation and purification.

The obtained polymeric ester was confirmed by I.R. spectrum and N.M.R. spectrum observations, and its esterification degree was observed by the quantitative analysis of the unreacted chlorine remaining in the product and included in each monomer unit by the method of microanalyais of halogen.

The results of the analysis are shown in the following table:

EXAMPLE 59

1.5 g. of the cinnamate ester of the polymers obtained in Example 4 dissolved in 7.5 ml. of cyclohexanone was applied on the surface of a sheet glass by a whirling applying device. After drying it, a film of 1 $\mu$ thickness was obtained on the glass surface.

A step tablet No. 2 (made by Kodak Company) with 21 stepped images was put on the produced photosensitive film on the surface of the sheet glass and it was exposed for a period of 21 minutes to a 40 watt chemical lamp at a distance of 10 cm. After the exposure the unexposed areas of the photosensitive film were dissolved and washed away with monochlorobenzene. As a result, on the sheet glass the images were printed, of which those up to the third step were distinguishable.

EXAMPLE 60

3.0 g. of the cinnamate ester of the polymers obtained in Example 40 and 0.24 g. of 5-nitroacenaphthene as a sensitizer, both dissolved in 15 ml. of cyclohexanone, were applied on the surface of a sheet glass by a whirling applying device. After drying them, a film of less than 1 $\mu$ thickness was obtained on the surface of the sheet glass.

A step tablet No. 2 (made by Kodak Company) with 21 stepped images was then put on the resultant photosensitive film on the glass surface and it was exposed

TABLE

| Ex. | Polymer abbreviation | g. | mole | Carboxyl Salt Compound | g. | mole | Solvent abbreviation | ml. | Catalyst g. | Reaction condition °C. | hrs. | Product g. | esterification degree |
|---|---|---|---|---|---|---|---|---|---|---|---|---|---|
| 40 | PCEA | 6.73 | 0.05 | potassium cinnamate | 9.3 | 0.05 | HMPA | 70 | 1.0 | 100 | 10 | 11.0 | 0.98 |
| 41 | PCEA | 6.73 | 0.05 | ammonium cinnamate | 10.1 | 0.05 | HMPA | 70 | 1.0 | 100 | 10 | 10.5 | 0.93 |
| 42 | PECH | 4.63 | 0.05 | potassium cinnamate | 11.2 | 0.06 | HMPA | 40 | 1.0 | 100 | 10 | 7.3 | 0.96 |
| 43 | PECH | 18.5 | 0.20 | potassium cinnamate | 41.0 | 0.22 | HMPA | 350 | 4.0 | 100 | 5 | 34.0 | 0.84 |
| 44 | PECH | 9.25 | 0.10 | Sodium cinnamate | 18.7 | 0.11 | HMPA | 150 | 2.0 | 100 | 8 | 17.8 | 0.87 |
| 45 | PECH | 9.25 | 0.10 | sodium α-cyano-cinnamate | 21.5 | 0.11 | HMPA | 150 | 2.0 | 60 | 5 | 18.3 | 0.81 |
| 46 | PECH | 9.25 | 0.10 | potassium cinnamildeneacetate | 21.2 | 0.11 | HMPA | 150 | 2.0 | 80 | 6 | 20.5 | 0.88 |
| 47 | PECH | 9.25 | 0.10 | potassium furfurylacrylate | 17.6 | 0.10 | HMPA | 150 | 2.0 | 70 | 8 | 18.1 | 0.91 |
| 48 | PECH | 9.25 | 0.10 | potassium p-azido-benzoate | 20.1 | 0.10 | HMPA | 150 | 2.0 | 50 | 7 | 13.8 | 0.74 |
| 49 | CEVE | 5.35 | 0.05 | potassium cinnamate | 10.25 | 0.055 | HMPA | 50 | 1.0 | 80 | 10 | 10.6 | 0.91 |
| 50 | CEVE | 5.35 | 0.05 | sodium α-cyano-cinnamate | 10.75 | 0.055 | HMPA | 50 | 1.0 | 50 | 5 | 5.2 | 0.63 |
| 51 | CEVE | 5.35 | 0.05 | potassium cinnamildeneacetate | 11.2 | 0.055 | HMPA | 50 | 1.0 | 80 | 10 | 11.2 | 0.90 |
| 52 | CEVE | 5.35 | 0.05 | potassium furfurylacrylate | 9.7 | 0.055 | HMPA | 50 | 1.0 | 80 | 10 | 10.1 | 0.91 |
| 53 | CEVE | 5.35 | 0.05 | potassium p-azido-benzoate | 11.1 | 0.055 | HMPA | 50 | 1.0 | 70 | 8 | 10.3 | 0.75 |
| 54 | PVCA | 6.03 | 0.05 | potassium cinnamate | 10.25 | 0.055 | HMPA | 50 | 1.0 | 70 | 5 | 10.3 | 0.97 |
| 55 | PVCA | 6.03 | 0.05 | sodium α-cyano-cinnamate | 10.75 | 0.055 | HMPA | 50 | 0.5 | 50 | 5 | 10.1 | 0.96 |
| 56 | PVCA | 6.03 | 0.05 | potassium cinnamilideneacetate | 11.2 | 0.055 | HMPA | 50 | 1.0 | 50 | 5 | 11.3 | 0.93 |
| 57 | PVCA | 6.03 | 0.05 | potassium furfurylacrylate | 9.7 | 0.055 | HMPA | 50 | 1.0 | 50 | 5 | 9.8 | 0.96 |
| 58 | PVCA | 6.03 | 0.05 | potassium p-azido-benzoate | 11.1 | 0.055 | HMPA | 50 | — | 50 | 6 | 9.3 | 0.92 |
| Reference Ex. | PECH | 9.25 | 0.1 | potassium cinnamate | 20.5 | 0.11 | glyme | 150 | 2.0 | 60 | 8 | 0 | — |

Abbreviations of the polymers:
PCEA: poly(2-chloroethylacrylate)
PECH: poly(epichlorohydrin)
(Except the oligomer in Example 42, this was used in the form of a rubber like material)
PCEVE: poly(2-chloroethylvinyl ether)
PVCA: poly(vinylchloroacetate)

Abbreviations of the solvents:
HMPA: hexamethylphosphoroamide
glyme: ethyleneglycoldimethylether for a period of 4 minutes to a 40 watt chemical lamp at a distance of 10 cm. After the exposure the unexposed areas of the photosensitive film were dissolved and washed away with monochlorobenzene. As a result, on the sheet glass the images were printed, of which those up to the 17th step were distinguishable.

EXAMPLE 61

A copper sheet was coated with 3.0 g. of the cinnamate ester of the polymer obtained in Exmmple 40 and 0.24 g. of 5-nitroacenaphthene, both dissolved in 15 ml. of cyclohexanone, to give a film thickness of 100 μ, by using a knife-coater. After drying thus provided coating at 50°C. for 1 hour, a film of 12 μ thickness was obtained on the copper surface.

A negative was then put on the obtained photosensitive film on the copper surface and it was exposed for a period of 4 minutes to a 40 watt chemical lamp at a distance of 10 cm. After the exposure the unexposed areas of the film were dissolved and washed away with monochlorobenzene. Then, this film was treated with an aqueous solution of ferric chloride for etching, the insoluble areas of the film were sufficiently resistant to the etching solution, and clear etching images on the copper were obtained.

It was confirmed that by the observation of the strength of the film having 12 μ thickness on the copper surface by Erichsen film tester, there were cracks on the copper sheet at D=8.5 mm., while the film did not show cracks but showed sufficient resistance to the applied stress of this value.

EXAMPLE 62

A polyester film was coated with 3.0 g. of the cinnamate ester of the polymer obtained in Example 40 and 0.24 g. of 5-nitroacenaphthene as a sensitizer, both dissolved in 15 ml. of cyclohexanone, to give a film thickness of 100 μ, by using a knife-coater. After drying thus formed coating at 50°C. for 1 hour, a film of 12 μ thickness was obtained on the polyester film surface.

The photosensitive film layer on the polyester film surface was well laminated to the surface of a copper sheet using heated pressure rollers at a temperature of 100°C. and the polyester film was easily peeled from the photosensitive film layer.

A polypropylene film used in place of the polyester one also showed a successful result.

The above Examples are believed to adequately illustrate all of the various embodiments of this invention.

What is claimed is:

1. A method of preparing a polymeric ester comprising condensing a polymer having a chloromethyl group in the aliphatic side chain of its repeating unit with a carboxyl salt having the formula:

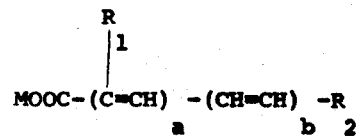

wherein M is selected from the group consisting of ammonium and alkali metals, $R_1$ is selected from the group consisting of hydrogen and a nitrile, $R_2$ is selected from the group consisting of a substituted and non-substituted aromatic, and $a$ and $b$ are selected from the group consisting of 0 and 1, the chemical equivalent of said salt being not less than 0.3 to the chemical equivalent of the chlorine of said polymer, by adding said salt to said polymer dissolved in an aprotic polar solvent.

2. A homo- or copolymeric ester capable of film forming and having the following repeating unit

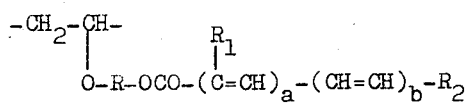

wherein R is an alkylene group, $R_1$ is selected from the group consisting of hydrogen and a nitrile, $R_2$ is selected from the group consisting of a substituted and non-substituted aromatic, and $a$ and $b$ are 0 or 1.

3. A homo- or copolymeric ester capable of film forming and having the following repeating unit

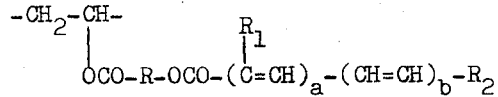

wherein R is an alkylene group, $R_1$ is selected from the group consisting of hydrogen and a nitrile, $R_2$ is selected from the group consisting of a substituted and non-substituted aromatic, and $a$ and $b$ are 0 or 1.

4. A process for the preparation of light-sensitive polymer which consists essentially of reacting a polymer of epichlorohydrin containing the recurring unit of the formula,

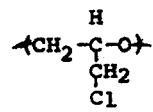

with an alkali metal salt of cinnamic acid in the presence of an aprotic polar solvent to cause substitution of the chlorine atoms in the chloromethyl groups in the polymer with cinnamate groups, the chemical equivalent of said salt being not less than 0.3 to the chemical equivalent of the chlorine of said polymer.

* * * * *